(12) United States Patent
Eisengräber-Pabst et al.

(10) Patent No.: US 8,157,938 B2
(45) Date of Patent: Apr. 17, 2012

(54) METHOD FOR THE STABILIZATION OF FOLDED FILTER MEDIA AND A FILTER MEDIUM STABILIZED BY SAID METHOD

(75) Inventors: Jobst Eisengräber-Pabst, Benningen (DE); Siegfried Rapp, Murr (DE); Pius Trautmann, Dingolfingen (DE); Johannes Lampert, Remseck (DE)

(73) Assignee: Mann+Hummel GmbH, Ludwigsburg (DE)

( * ) Notice: Subject to any disclaimer, the term of this patent is extended or adjusted under 35 U.S.C. 154(b) by 983 days.

(21) Appl. No.: 11/997,154

(22) PCT Filed: Jul. 19, 2006

(86) PCT No.: PCT/EP2006/064401
§ 371 (c)(1),
(2), (4) Date: Jun. 7, 2008

(87) PCT Pub. No.: WO2007/012588
PCT Pub. Date: Feb. 1, 2007

(65) Prior Publication Data
US 2009/0200228 A1    Aug. 13, 2009

(30) Foreign Application Priority Data
Jul. 29, 2005  (DE) ................. 10 2005 036 366

(51) Int. Cl.
*B65H 81/00* (2006.01)
*B01D 46/52* (2006.01)

(52) U.S. Cl. ......... 156/172; 55/498; 55/499; 55/DIG. 5; 210/493.5; 210/497.01

(58) Field of Classification Search ............... 210/493.5, 210/497.01; 55/498, 499, DIG. 5; 156/172, 156/176
See application file for complete search history.

(56) References Cited

U.S. PATENT DOCUMENTS

| | | | | |
|---|---|---|---|---|
| 4,652,285 A * | 3/1987 | Greene | ............................ | 55/498 |
| 5,098,767 A * | 3/1992 | Linnersten | ....................... | 95/273 |
| 5,885,392 A * | 3/1999 | Mules | ........................... | 156/204 |
| 5,897,729 A * | 4/1999 | Bikson et al. | ................. | 156/172 |
| 6,102,978 A * | 8/2000 | Butler | ............................ | 55/492 |
| 7,267,878 B2 * | 9/2007 | Primke et al. | ............. | 428/423.1 |
| 7,874,431 B2 * | 1/2011 | Eisengraeber-Pabst et al. | .......................... | 210/493.1 |
| 2006/0254975 A1 * | 11/2006 | Wolf et al. | .................... | 210/450 |
| 2010/0326028 A1 * | 12/2010 | Sundet | ............................ | 55/499 |

FOREIGN PATENT DOCUMENTS

| | | |
|---|---|---|
| DE | 19737954 A1 | 3/1999 |
| DE | 10244925 A1 | 4/2004 |
| GB | 2020995 A | 11/1979 |

* cited by examiner

Primary Examiner — Robert Clemente
(74) Attorney, Agent, or Firm — James Hasselbeck

(57) ABSTRACT

In a method for stabilizing folded filter media, a thread is coated with a hot melt adhesive to prepare a coated thread. The coated thread is wound in a plastic state about fold tips of a folded filter medium. The plastic state of the coated thread is maintained by applying heat. The heat is applied in the form of hot air, infrared radiation, or generated by microwaves.

12 Claims, 1 Drawing Sheet

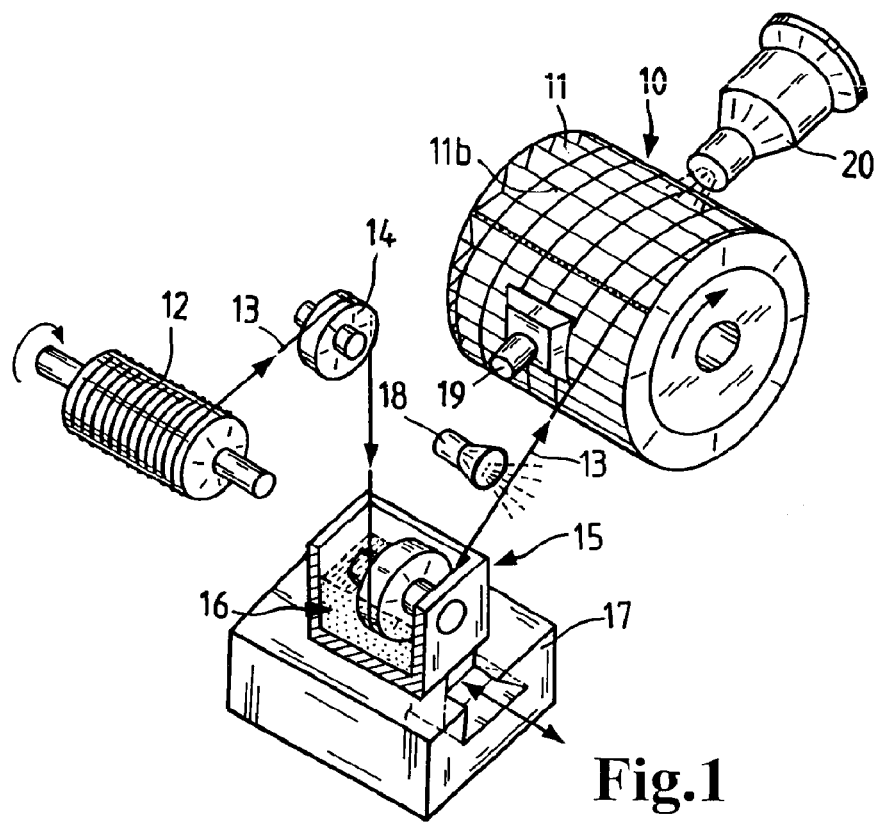
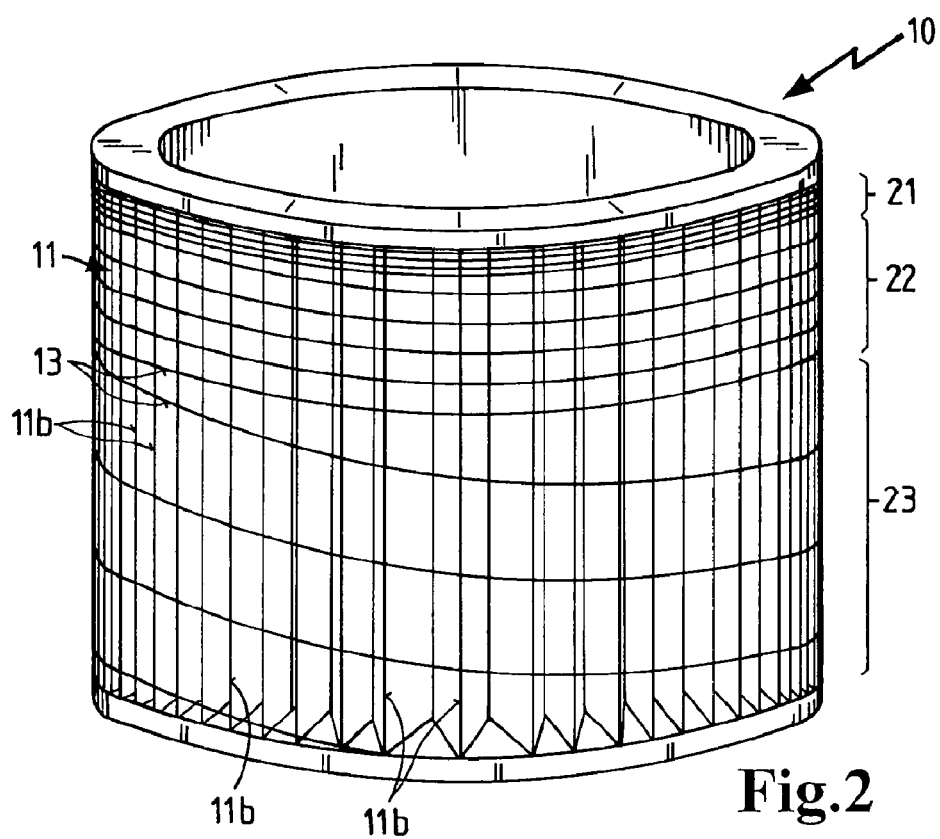

METHOD FOR THE STABILIZATION OF FOLDED FILTER MEDIA AND A FILTER MEDIUM STABILIZED BY SAID METHOD

BACKGROUND OF THE INVENTION

The invention concerns a method for the stabilization of folded filter media as well as a filter medium produced by this method. Filter elements of this kind are used as filter elements mostly in connection with terminal disks arranged at the end faces. The zigzag-folded filter media can be supported inwardly on a hollow body, for example, a center tube, for stabilization. As a result of folding, the fold tips on the exterior that are facing away from the center are very unstable. This can lead to denting or buckling of the filter medium when handling this filter element for service purposes or in an operational state.

A method for stabilizing the folds of the filter elements is disclosed in DE 102 44 925 in which a thread impregnated with a hot melt adhesive is wound about the filter medium. For impregnating the thread with hot melt adhesive, the thread is pulled through a molten pool and by means of downstream thread guides is wound onto the filter medium. The thread, when in its plastic state, contacts the filter medium and adheres thus to the external fold tips. However, it has been found that the adhesion between fold thread and the fold tips is often not satisfactory and that the thread, in particular after exposure to moisture, will become detached when subjected to minimal loads.

SUMMARY OF THE INVENTION

It is therefore an object of the invention to provide a method by means of which the connection between thread and fold tips can be significantly stabilized. Moreover, a filter medium is to be produced that exhibits increased stability. This object is solved in that the thread is coated with a hot melt adhesive and is wound in the plastic state about the fold tips, wherein the plastic state of the coated thread is maintained by thermal means.

The invention is based on the idea that the hot melt adhesive that is already in its plastic state is imparted with improved adhesion relative to the filter medium by the action of thermal energy. It is conventional to impregnate the thread with a thermally liquefied hot melt adhesive and to wind the thread onto the filter medium by thread guides. The thread can have, for example, a round or a rectangular strip-shaped cross-section. Threads of synthetic materials have been found to be especially suitable because of their good absorption capacity. As a result of thermal action on the hot melt adhesive already in the plastic state, the adhesion of the hot melt adhesive relative to the medium fibers and the penetration into the medium are improved. This effect is based on the delayed hardening of the hot melt adhesive. The thermal action can be realized, for example, by a treatment with heat reflectors that delay cooling of the hot melt adhesive.

Experiments have shown that the pull-off force for pulling the thread off the filter medium is increased fourfold in the dry state and tenfold in the wet state. By means of this improved adhesion the number of threads can be reduced for maintaining the same stability or the stability can be increased without applying more thread material.

According to one embodiment of the invention it is proposed to treat the thread impregnated with hot melt adhesive with hot air, infrared beam or microwaves. Of course, all heat sources known in the prior art can be utilized as thermal means. This heat action on the molten material can simply maintain the already existing temperature of the hot melt adhesive or increase it. In this way, it is advantageously possible to guide the thread across farther stretches and to apply the hot melt adhesive with optimal temperature onto the filter medium without there being the risk of dripping.

In an advantageous embodiment of the invention, the thermal means are positioned between the site of coating of the thread with hot melt adhesive and the contact location of the thread at the fold tips. In this way, a uniform temperature control of the hot melt adhesive is achieved so that the energy expenditure is reduced and heat loss or heating of the environment is minimized. This is important because the melting point of the hot melt adhesive usually employed is approximately 200 degrees Celsius.

In a further variant of the invention, the thermal means act on the thread that is already in contact with the fold tips. In this way, the cooling process can be further delayed. Based on the fact that the amount of time for satisfactory impregnation of the medium should not drop below a fixed unit of time, it is therefore possible to accelerate the winding process and to shorten in this way the cycle time for stabilizing the filter medium.

According to a particular embodiment of the method according to the invention, the thread that has been melted onto the filter medium is cooled so that the hot melt adhesive is hardened faster. This can be achieved, for example, by blowing cold air. The targeted cooling of the thread or the entire filter medium can greatly reduce the cycle time for producing the filter medium. This can be achieved in particular by heating the thread that is already located on the filter medium, in combination with increased winding speed and targeted cooling. As a result of the accelerated hardening of the molten material, the filter medium is therefore also available quickly for further processing.

The idea of a further embodiment of the invention is to guide the thread coated with the hot melt adhesive through a stripper aperture. At the stripper aperture, the thread is reduced to a defined output thickness. The stripped-off molten material can be returned to the molten pool. In addition to recycling excess hot melt adhesive, the stripper aperture also provides pretension of the thread that ensures excellent contact and contact pressure of the thread against the fold tips.

According to a further embodiment, the thread is wound in a coil shape about the filter medium. For this purpose, the supply of the thread during rotation of the filter medium is moved in a longitudinal direction of the filter medium so that an advancing movement is achieved. By means of this advancing movement a pitch is defined. Alternatively, the pitch for a constant feeding speed or for a stationary thread supply can be achieved by a longitudinal movement of the filter medium. The action of the thermal means can extend across a longitudinal area of the filter medium so that several threads can be heated or cooled at the same time. In this way, the entire filter medium can be advantageously reinforced by a continuous thread.

A further optimization proposes to divide the pitch of the thread into different sections. For example, the pitch can be provided within an area designed as a handling protection means with a pitch of approximately 5 to 8 millimeters and in a second area purely as stabilization with a pitch of approximately 30 millimeters. In order to achieve in the area of the end face of the cylindrical outer surface a secure fixation of the thread, the feed of the thread in the longitudinal direction can be minimized such that the threads overlap or that between the threads a continuous melt layer is produced. Generally, there is also the possibility to apply several threads in parallel as a double helix.

The invention concerns also a filter medium that is manufactured in accordance with the method of the present invention and is comprised of a substantially hollow cylindrical zigzag-folded filter medium. The end face of this zigzag-folded arrangement are sealed off by terminal disks and have contours for providing a seal-tight connection to matched connecting contours. Threads that serve for stabilization of the filter medium can extend into the area of the terminal disks. The advantages of the filter medium lie in the increased stability of the connection to the stabilizing threads; a positive effect is very much noticeable in particular when moisture is present. The risk of detachment of the thread upon manipulation and utilization or by pulsation loads and deposition of dirt is greatly reduced. In this way, the performance of the filter medium with regard to service life, degree of separation, and dirt capacity can be increased significantly.

In addition to being disclosed in the claims, these and further features of preferred embodiments of the invention can be taken from the description and the drawing, wherein the individual features, alone or combined in sub-combinations can be realized in the embodiment of the invention and in other fields and can represent advantageous embodiments as well as patentable embodiments for which protection is claimed.

BRIEF DESCRIPTION OF THE DRAWINGS

One embodiment of the method and of the filter medium will be disclosed with the aid of the drawings.

It is shown in:

FIG. 1 a schematically illustrated method; and

FIG. 2 filter element with a filter medium reinforced by this method.

EMBODIMENT(S) OF THE INVENTION

In FIG. 1 the method according to the invention is illustrated according to which a zigzag-shaped filter medium 11 that is part of a filter element 10 is reinforced by a thread 13. The thread 13 is wound on a bobbin 12 and is pulled by means of a thread guide 14 through a hot melt application device 15. In the hot melt application device 15, the hot melt adhesive 16 that has been liquefied by heat action is present. The thread 13 is impregnated with the hot melt adhesive 16 and is wound subsequently onto the rotating filter medium 11. In this way, the thread 13 comes into contact with the fold tips 11b of the filter medium 11. The hot melt application device 15 is slidably supported on a guide unit 17 so that, by sliding it in the direction of the longitudinal axis of the filter medium 11, the thread 13 is wound helically. Between the hot melt application device 15 and the contact location of the thread 13 on the fold tips 11b of the filter medium 11, a radiant heater 18 is arranged. By heat action of the radiant heater 18 hardening of the hot melt adhesive on the thread 13 is delayed. This effect is achieved also by a second radiant heater 19 that heats the hot melt adhesive 16 when it is already in contact with the fold tips 11b. The second radiant heater 19 can act across a longitudinal area of the filter medium 11 and can heat several threads at the same time. In order to cool the hot melt adhesive 16 on the thread 13 in a targeted fashion, a cooling fan 20 is illustrated that effects an accelerated hardening of the hot melt adhesive 16.

FIG. 2 shows a filter element 10 with a filter medium 11 produced by the illustrated method. The thread 13 is wound onto the filter medium 11 and glued to the fold tips 11b. The thread 13 wound in a coil shape has different pitches. In the locking area adjoining the end face with minimal or no pitch the thread 13 overlaps. In the handling protection area 20 the pitch is selected such that a safe handling of the filter element is possible without risking denting. In the stabilization area 23 the pitch is greatest and serves only for radial stabilization of the folds of the filter element 11.

What is claimed is:

1. Method for stabilizing folded filter media, the method comprising the steps of:
   providing a hot-melt impregnable thread;
   liquefying hot melt adhesive by applying heat;
   coating said thread with said liquefied hot melt adhesive to form a hot melt adhesive coated thread;
   winding the coated thread in a plastic state circumferentially about a radial outside surface of said folded filter medium and onto said fold tips of said outside surface of said folded filter medium;
   maintaining the plastic state of the coated thread by thermal means;
   passing the coated thread through a stripper aperture reducing said coated thread to a defined output thickness after the step of coating.

2. Method according to claim 1, wherein the thermal means is selected from hot air, infrared radiation, or microwaves, said thermal means applying heat to said coated thread.

3. Method according to claim 2, wherein
   the method further comprises the step of arranging the thermal means to heat said coated thread in a thread position between a coating location of the thread and a contacting location of the coated thread on the fold tips,
   wherein in the winding step, the coated thread is wound in a coil shape onto the outside surface of the filter medium.

4. Method according to claim 3, wherein
   in the liquefying step, said liquefied hot melt adhesive forms a molten pool of hot melt,
   wherein in the coating step, said thread is coated by pulling said thread through said molten pool.

5. Method according to claim 1 further comprising the step of
   arranging the thermal means between a coating location of the thread and a contacting location of the coated thread on the fold tips.

6. Method according to claim 1, further comprising the step of
   positioning the thermal means relative to the filter medium such that the thermal means applies heat to the coated thread located on the fold tips.

7. Method according to claim 1, wherein the coated thread after having been wound onto the fold tips is cooled.

8. Method according to claim 1, wherein the coated thread is wound in a coil shape about the filter medium.

9. Method according to claim 8, wherein a different pitch of the coil shape is achieved by varying a winding speed of the coated thread or by varying a thread feed of the coated thread.

10. Filter medium having a reinforcement in the form of a thread applied according to claim 1.

11. Method for stabilizing folded filter media, the method comprising the steps of:
    providing a hot-melt impregnable thread;
    liquefying hot melt adhesive by applying heat;
    coating said thread with said liquefied hot melt adhesive to form a hot melt adhesive coated thread;
    winding the coated thread in a plastic state circumferentially about a radial outside surface of said folded filter medium and onto said fold tips of said outside surface of said folded filter medium;
    maintaining the plastic state of the coated thread by thermal means;

wherein the coated thread is wound in a coil shape about the filter medium,
wherein a different pitch of the coil shape is achieved by varying a thread feed of the coated thread or by varying a winding speed of the coated thread.

12. Method for stabilizing folded filter media, the method comprising the steps of:
   providing a hot-melt impregnable thread;
   liquefying hot melt adhesive by applying heat;
   coating said thread with said liquefied hot melt adhesive to form a hot melt adhesive coated thread;
   winding the coated thread in a plastic state circumferentially about a radial outside surface of said folded filter medium and onto said fold tips of said outside surface of said folded filter medium;
   maintaining the plastic state of the coated thread by thermal means;
   wherein the thermal means is selected from hot air, infrared radiation, or microwaves, said thermal means applying heat to said coated thread,
   wherein the method further comprises the step of arranging the thermal means to heat said coated thread in a thread position between a coating location of the thread and a contacting location of the coated thread on the fold tips,
   wherein in the winding step, the coated thread is wound in a coil shape onto the outside surface of the filter medium,
   wherein in the liquefying step, said liquefied hot melt adhesive forms a molten pool of hot melt,
   wherein in the coating step, said thread is coated by pulling said thread through said molten pool,
   wherein in the winding step, the thread is wound onto the fold tips such that the wound thread forms wound areas on the fold tips having different thread pitches,
   wherein said different thread pitches are achieved by either varying a thread feed of the coated thread or by varying a winding speed of the coated thread onto the fold tips.

* * * * *